US008690684B2

(12) United States Patent
Vanbragt et al.

(10) Patent No.: US 8,690,684 B2
(45) Date of Patent: Apr. 8, 2014

(54) PLAYER RECRUITMENT FOR ONLINE GAME REWARDS

(75) Inventors: Erik Francis Vanbragt, San Francisco, CA (US); William Henry Kelly Mooney, San Francisco, CA (US); Matthew Adam Ocko, Palo Alto, CA (US); Carl Eric Schiermeyer, Burlingame, CA (US); Jonathan Chang Tien, San Francisco, CA (US); Roger F. Dickey, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 359 days.

(21) Appl. No.: 13/244,755

(22) Filed: Sep. 26, 2011

(65) Prior Publication Data

US 2012/0015738 A1 Jan. 19, 2012

Related U.S. Application Data

(63) Continuation of application No. 12/779,015, filed on May 12, 2010, now Pat. No. 8,262,468.

(60) Provisional application No. 61/236,080, filed on Aug. 21, 2009.

(51) Int. Cl.
*A63F 9/24* (2006.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| 6,375,568 | B1 * | 4/2002 | Roffman et al. | 463/26 |
|---|---|---|---|---|
| 8,012,014 | B2 | 9/2011 | Low et al. | |
| 8,262,468 | B1 | 9/2012 | Vanbragt et al. | |
| 2002/0094870 | A1 * | 7/2002 | Murray | 463/42 |
| 2004/0166918 | A1 * | 8/2004 | Walker et al. | 463/16 |
| 2004/0259641 | A1 * | 12/2004 | Ho | 463/42 |
| 2007/0129141 | A1 * | 6/2007 | Walker et al. | 463/25 |
| 2007/0244757 | A1 * | 10/2007 | Walter | 705/14 |
| 2008/0234043 | A1 * | 9/2008 | McCaskey et al. | 463/29 |
| 2009/0239666 | A1 * | 9/2009 | Hall et al. | 463/42 |
| 2009/0305774 | A1 * | 12/2009 | Farone et al. | 463/25 |
| 2010/0056280 | A1 * | 3/2010 | Langan et al. | 463/42 |
| 2010/0062840 | A1 * | 3/2010 | Herrmann | 463/25 |
| 2010/0203963 | A1 * | 8/2010 | Allen et al. | 463/30 |
| 2010/0216553 | A1 * | 8/2010 | Chudley et al. | 463/42 |
| 2010/0279764 | A1 * | 11/2010 | Allen et al. | 463/25 |
| 2010/0331064 | A1 * | 12/2010 | Michelstein et al. | 463/1 |

(Continued)

OTHER PUBLICATIONS

U.S. Appl. No. 13/244,745, Response filed Oct. 15, 2012 to Final Office Action mailed Jul. 13, 2012, 12 pgs.

(Continued)

*Primary Examiner* — Xuan Thai
*Assistant Examiner* — Michael Grant
(74) *Attorney, Agent, or Firm* — Schwegman, Lundberg & Woessner, P.A.

(57) ABSTRACT

Example systems and methods related to player recruitment for acquiring rewards in an online game network is presented. In an example, an online game for a plurality of players is hosted. A player of the game is provided an asset based satisfaction of an acquisition requirement that includes a social requirement satisfied by a new association of a predetermined number of people with the online game.

17 Claims, 7 Drawing Sheets

(56) References Cited

U.S. PATENT DOCUMENTS

2012/0015736 A1 1/2012 Vanbragt et al.
2012/0015740 A1 1/2012 Vanbragt et al.
2012/0015742 A1 1/2012 Vanbragt et al.

OTHER PUBLICATIONS

U.S. Appl. No. 13/244,766, Response filed Oct. 15, 2012 to Final Office Action mailed Jul. 13, 2012, 11 pgs.
U.S. Appl. No. 13/244,774, Response filed Oct. 16, 2012 to Final Office Action mailed Jul. 16, 2012, 11 pgs.
U.S. Appl. No. 13/244,745, Final Office Action mailed Jul. 13, 2012, 14 pgs.
U.S. Appl. No. 13/244,766, Final Office Action mailed Jul. 13, 2012, 9 pgs.
U.S. Appl. No. 13/244,774, Final Office Action mailed Jul. 16, 2012, 12 pgs.
U.S. Appl. No. 13/244,745, Non Final Office Action mailed Feb. 13, 2012, 13 pgs.
U.S. Appl. No. 12/244,745, Examiner Interview Summary mailed Mar. 19, 2012, 3 pgs.
U.S. Appl. No. 12/779,015, filed Feb. 22, 2012, 47 pgs.
U.S. Appl. No. 12/779,015, Examiner Interview Summary mailed Mar. 15, 2012, 3 pgs.
U.S. Appl. No. 12/779,015, Non-Final Office Action mailed Dec. 1, 2011, 9 pgs.
U.S. Appl. No. 12/779,015, Response filed Apr. 2, 2012 to Non Final Office Action mailed Dec. 1, 2011, 10 pgs.
U.S. Appl. No. 13/244,766, Non-Final Office Action Mailed Feb. 21, 2012, 13 pgs.
U.S. Appl. No. 13/244,774, Non Final Office Action Mailed Feb. 14, 2012, 15 pgs.

* cited by examiner

US 8,690,684 B2

PLAYER RECRUITMENT FOR ONLINE GAME REWARDS

CLAIM OF PRIORITY

This application is a continuation of U.S. patent application Ser. No. 12/779,015, entitled "VIRAL DYNAMIC REWARDS IN A MULTIUSER GAME NETWORK," and filed May 12, 2010, now U.S. Pat. No. 8,262,468 which claims the benefit of U.S. Provisional Application No. 61/236,080, entitled "VIRAL DYNAMIC REWARDS IN A MULTIUSER GAME NETWORK," and filed Aug. 21, 2009. The contents of each of these applications are hereby incorporated herein by reference in their entirety.

TECHNICAL FIELD

The present disclosure relates to games and applications in general and in particular to computer-implemented online games, such as online role-playing games, playable by more than one person from more than one location.

BACKGROUND

In many games, there is a virtual world or some other imagined playing space and a player of the game controls one or more player characters (herein "character," "player character," or "PC"). Player characters can be considered in-game representations of the controlling player; as such, all uses of the terms "player," "user," "entity," and "friend" refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

An electronic social networking system typically operates with a social networking server or servers providing interaction between users such that a user can specify other users of the social networking system as "friends." As should be apparent, a collection of users and the "friend" connections between users can form a social graph that can be traversed to find second, third and more remote connections between users, much like a graph of nodes connected by edges can be traversed.

In many computer games, there are various types of in-game assets (aka "loot") that a player character can obtain within the game. For example, a player character may acquire game points, gold coins, experience points, character levels, character attributes, virtual cash, or other in-game items of value. In some games, the goal of the game may be to acquire in-game assets. For example, a player may strive to achieve a high score by accumulating points that are granted for performing in-game tasks or overcoming in-game obstacles. In some games, these in-game assets can used to acquire in-game rewards. For example, a player character may be able to acquire a magical sword (i.e., the reward) in exchange for a number of gold coins (i.e., the assets).

DESCRIPTION OF EXAMPLE EMBODIMENTS

Figure 1:
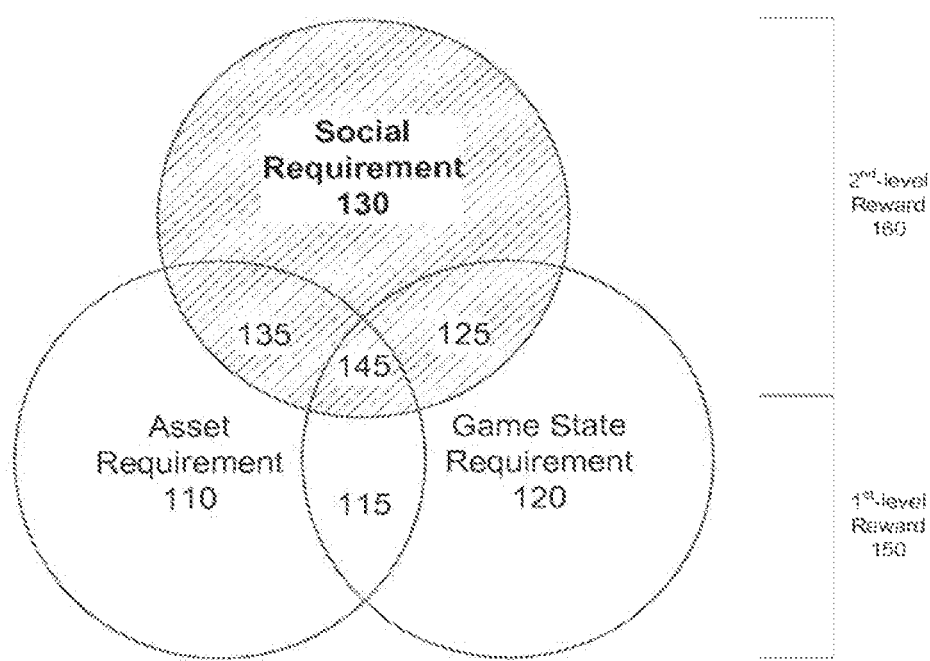
FIG. 1 shows a Venn diagram illustrating the reward acquisition requirements for various combinations of an asset requirement, a game state requirement, and a social requirement.

Game Systems, Social Networks, and Social Graphs

In an online multiplayer game, players control player characters (PCs), a game engine controls non-player characters (NPCs) and game features, and the game engine also manages player character state and tracks state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. The game engine uses player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

A game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. The social graph has a node for each entity, and edges to represent relationships between entities. A node in a social graph can represent any entity. The present disclosure assumes that at least one entity of a social graph is a player or player character in an online multiplayer game, though the present disclosure is intended to cover all types of social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through edges (or N−1 other users), they are deemed to be separated by N degrees of separation. This user would be a so-called "N-degree friend." As used herein, the term "friend" means only first-degree friends.

In one embodiment, the social graph is managed by the game networking system 520b managed by the game operator. In another embodiment, the social graph is part of a social networking system 520a managed by a third-party (e.g., Facebook, Friendster, Myspace, etc.). In yet another embodiment, a player has a social graph on both the game networking system 520*b* and the social networking system 520*a*, wherein the player can have a social network on the game networking system 520*b* that is a subset, superset, or independent of the player's social network on the social networking system 520*a*. In such combined systems, the game network system 520*b* can maintain social graph information with edge type attributes that indicate whether a given friend is an "in-game friend," a "social network friend," or both. The various embodiments disclosed herein are operable when the social graph is managed by a social networking system 520*a*, a game networking system 520*b*, or both.

Within the social graph, each player (or player character) has a social network. A player's social network includes all users in the social graph within $N_{max}$ degrees of the player, where $N_{max}$ is the maximum degree of separation allowed by either the social networking system 520*a* or the multiuser game engine 520*b*. In some embodiments, $N_{max}$ is unlimited and the player's social network is coextensive with the social graph.

Reward Acquisition Requirements:

In various embodiments, an online multiplayer game can provide a mechanism for player characters to acquire in-game rewards. In some embodiments, a reward can provide an in-game benefit for the player character, such as increasing the player character's likelihood or ability to advance in the game. For example, rewards could be character levels, ability points, or skill points, hit points, mana points, combat bonuses, etc. Rewards can also be virtual representations of real life things such as cash, precious valuables, personal property, real property, weapons, vehicles, titles, jobs, etc. Rewards can also include mythical and fantasy things, such as manna, game keys, magical items, potions, relics, artifacts, etc. Typical in-game benefits include special abilities, enchanted items, or game keys, wherein these benefits may allow the player character to advance at a more rapid rate or satisfy a gate condition that allows the player character to advance past a certain point in the game. Benefits may also include in-game authority, rights, or status.

In various embodiments, a player character can only acquire certain in-game rewards after satisfying certain requirements. These combined requirements are considered the "acquisition requirements" of the reward. An acquisition requirement can have various components, including an asset requirement, a game state requirement, and a social requirement, or any combination thereof. One of ordinary skill in the art will recognize that other components are possible, which can be included within the acquisition requirement of the reward. The game engine can provide a variety of mechanisms by which a player character can acquire a reward once the acquisition requirements have been met.

FIG. 1 shows a Venn diagram 100 illustrating the reward acquisition requirements for various combinations of an asset requirement, a game state requirement, and a social requirement.

In some embodiments, certain rewards can only be acquired after satisfying an asset requirement 110, a game state requirement 120, a social requirement 130, or any combination of these three requirements. For example, a reward may have an acquisition requirement consisting of both an asset requirement and a game state requirement 115. Or it may have an acquisition requirement consisting of both a social requirement and a game state requirement 125. Or it may have an acquisition requirement consisting of a social, asset, and game state requirement 145. One of ordinary skill in the art will recognize that various combinations possible.

As used herein, a "second-level reward" 160 (aka "viral reward") is any reward with an acquisition requirement that includes at least some social requirement component (i.e., regions 125, 130, 135, 145 on the Venn diagram). Similarly, a "first-level reward" 150 is any reward with an acquisition requirement that includes only an asset requirement 110, a game state requirement 120, or a combination of the two 115.

Asset Requirements:

In some embodiments, a player character can acquire certain in-game rewards only after satisfying an asset requirement 110. In one example embodiment, a player character can collect in-game assets during the course of game play (e.g., virtual currency) and trade a number of those assets for a reward. In this embodiment, the acquisition requirement consists of only an asset requirement, wherein the asset requirement is acquiring a certain number of in-game assets and exchanging those assets for the reward.

Figure 2:
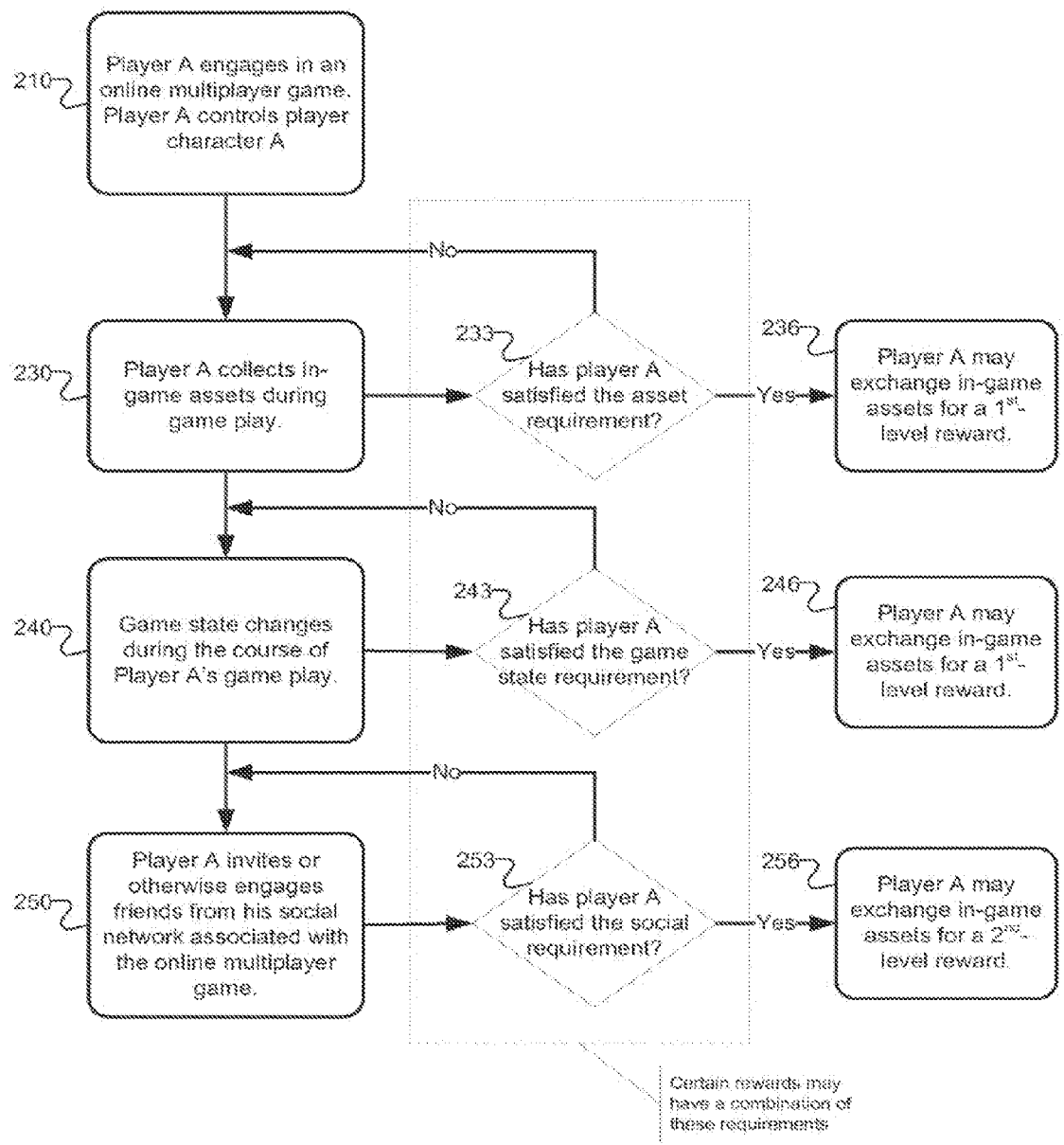
FIG. 2 shows a flowchart illustrating an example method 100 of operating a multiplayer online game with viral rewards.

For example, referring to FIG. 2, in step 210 player A can engage in an online multiplayer game, wherein player A controls player character A. During the course of the game, player A (via player character A) can collect in-game assets, such as gold coins, in step 230. The number or amount of gold coins collected by player A can depend on how successful player A is or how long the player A plays in the game. In some embodiments, during normal game play, player A can be awarded gold coins for performing, executing, or attempting certain in-game events. The award of gold coins is analogous to scoring points or to being paid to perform tasks in a certain type of currency or other type of asset.

In step 233, the game engine can check to see if player A has sufficient assets to satisfy the asset requirement to acquire a first-level reward. If so, then player A may have the option of acquiring that reward at step 236. One of ordinary skill in the art will recognize that the game engine can provide a variety of mechanisms for granting rewards after the asset requirements have been satisfied. For example, the game may provide an in-game mechanism for exchanging these gold coins for various rewards, such as a virtual store. At the virtual store, the player character may have the option of trading a number of gold coins in exchange for one or more first-level rewards. For example, the player character could spend 10 gold coins to buy a healing potion, which allows the player character to heal damage suffered in-game. Or the player character could spend 200 gold coins to buy an invisibility cloak, which allows the player character avoid certain in-game obstacles. Or the player could spend 5,000 gold coins to buy a castle key, which allows the player to advance to the next level of game play. If the player character does not have sufficient assets to satisfy the asset requirement, the virtual store will not allow the player to purchase the reward.

In some embodiments, a player character may need more than one type of in-game asset to purchase a reward. For example, a player character may need 10,000 gold coins and 10 lbs. of adamantine in order to purchase a magical longsword.

In some embodiments, rewards can also be treated as assets for the purpose of satisfying an asset requirement. For example, a player character could spend 1,000 gold coins to buy a ruby. Once the player character acquires 10 rubies and 2 lbs. of steel. he can exchange them for a magical dagger.

In some embodiments, a player character may be able to acquire a reward by merely acquiring, but not necessarily expending, a certain number of in-game assets. For example, if the player character acquires five magical crests, a dragon will reward him by giving the Charm of Rubiss to the player character; however, the player character also retains the magical crests after the transaction.

Game State Requirements:

In some embodiments, a player character can acquire certain rewards only after a game state requirement 120 has been satisfied. In step 240, during the course of player A's game play, game state can change. For example, the internal game clock can change, the virtual game environment can change, or attributes of NPCs or other PCs may change. In step 243, the game engine can check to see if the game state with respect to player A is satisfied for purposes of acquiring a first-level reward. If so, then player A may have the option of acquiring that reward at step 246.

As used herein, game state includes all game parameters that are not related to a player character's in-game assets or online social interactions. Game state can include parameters tracked or controlled by the game engine. For example, player A may not be able to acquire a reward until he defeats all monsters on the 9th level of the dungeon, or until it is high tide in the virtual game environment. Game state can also include game parameters controlled by other player characters. For example; player A may not be able to acquire a reward until certain other players have completed a specified task.

In some embodiments, the reward may also have an asset requirement and/or a social requirement. For example, player A may be able to buy a magic staff only once he has acquired 1,000 gold coins and successfully completed the quest to rescue the blacksmith's daughter. In another example, player A may be able to buy the magical mandrake root only once he has acquired 10,000 experience points, successfully invited eight friends from his social network to play the game, and entered the city of Ambrosia during a full moon.

Social Requirements:

In some embodiments, a player character can acquire certain in-game rewards only after satisfying a social requirement 130. These in-game rewards are considered second-level rewards, wherein the rewards can only be acquired after satisfying some type of social requirement related to the social network associated with the player character. Second-level rewards are also called "viral rewards" because they incentivize players to invite or engage other users to play the game as well as increase the breadth and scope of the player's social network.

As described above, a multiuser game networking system 520b can be merged, connected, linked, associated with, or otherwise configured to access one or more online social networking systems 520a. When a multiuser online game is associated with an external social network, the game can be shared with other users in the social graph, some of whom may be within a player's social network. Via the game system, the social networking system, or both, a player can engage in a variety of online social interactions (aka "social links") related to the multiuser online game. For example, a first player can send invitations to join the game to friends in his social network. Some of these friends may join the game (a so-called "successful invitation"), while others may not. Once these friends join the game and create their own player characters, they may have the option of joining an in-game team (aka, mob, gang, set, army, business, crew, etc., depending on the nature of the game) established or controlled by the player character of the first player. Also, once these friends have created their own player characters, the first player may be able to gift or transfer in-game assets from his player character to his friend's player characters.

In some embodiments, the game engine can track (e.g., in a database) the number of in-game assets possessed by a player character, the game state, and the number of social links established by the player character. Once the player character satisfies the requisite number of social links, the player character may have the option of acquiring a second-level reward. In some embodiments, the second-level reward may also have an asset requirement and/or a game state requirement.

For example, within the multiplayer online game, player A can invite friends from player A's social network to also play the game in step 130. Once player A accumulates a requisite number of a in-game assets and tallies the requisite number of successful invitations for new players from his social network to play the game, player A can exchange some amount or all of his accumulated in-game assets and get credit for the number of successfully invited friends, and thereby acquire some second-level reward in step 256. For example, if player A has acquired 100 gold coins and successfully invited two friends from his social network to play the game (or caused two friends who have already have player characters in the game to establish an in-game social connection or in-game contact relationship), player A can then be entitled to receive, in exchange for the 100 gold coins, a second-level reward.

Like a first-level reward, a second-level reward can provide various in-game benefits, abilities, rights, or value that may or may not be related to advancing game play. As described above, each of the aforementioned types of rewards can be assigned a degree with which to define a hierarchy of in-game rewards. For example, in-game rewards can include first, second, and third-degree rewards, wherein a third-degree reward is stronger or more beneficial than a first-degree reward.

In some embodiments, a player can only get certain higher-degree rewards once he has successfully invited a set number of friends from his social network to join the game. The number of friends invited from a social network to join the game can be counted cumulatively from the first time the player plays the game or can be occasionally reset from time to time. For example, the number of successful invitations can be reset each time the user exchanges in-game assets plus a number of successful invitations for a second-level reward. Alternatively, a player character's tally of successful invitations is never reset and the requirement for acquiring higher-degree rewards is based on the cumulative number of successful invitations by that player.

In some embodiments, certain second-level rewards can only be obtained if the player and the friends he has invited to join the game are associated within the game. For example, the social requirement for a reward may only be satisfied in the player and his friends are all part of the same guild in the game. Alternatively, the social requirement may only be satisfied if the player and a certain number of his friends pursue the same quest. For example, a player may want a magical ring, but to get the magical ring, the player may be required to invite ten friends from his social graph as well as convince them to collectively or individually also attempt to acquire the magical ring.

In some embodiments, the game engine can require a player to have multiple types of successful invitations before acquiring a reward. For example, a player may be required to have two successful first-degree friend invitations as well as four successful second-degree friend invitations. One of ordinary skill in the art will recognize that various other configurations of various degrees of successful invitations can be required for the player to acquire various rewards. Similarly, the game engine can determine various mixes of invitations, cash or other in-game assets are required for the player to acquire a reward.

Dynamic Variation of Asset, Social, and Game State Requirements:

In some embodiments, the acquisition of in-game rewards can depend on multiple factors. For example, the acquisition of a reward by player A can depend on the player's social network, in-game assets, character/experience level, character class/type, in-game abilities, amount of time spent playing the game, independent game clocks, attributes of other player characters, etc. One of ordinary skill in the art will recognize that the acquisition of in-game rewards can depend on any number of factors.

Figure 3:
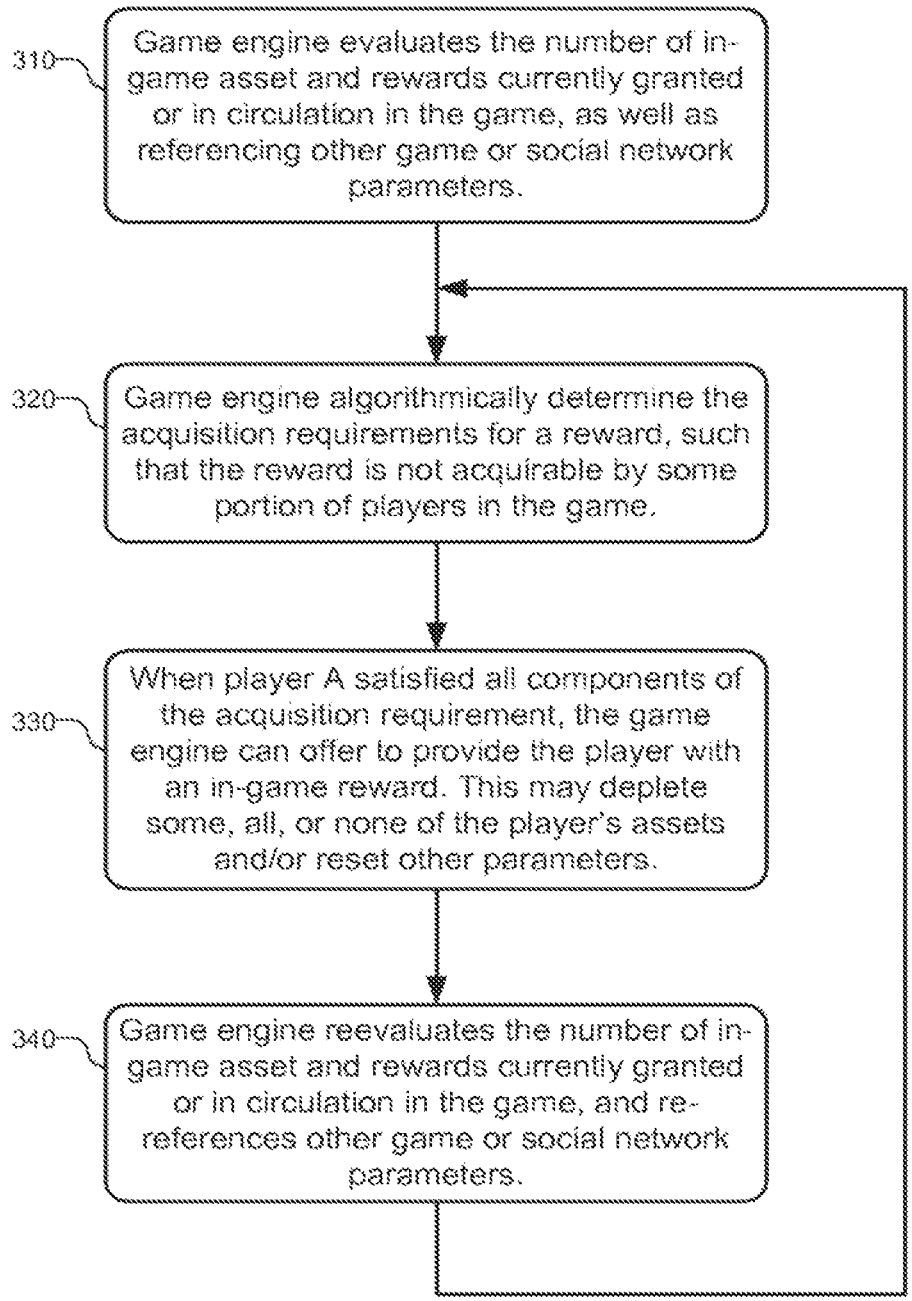
FIG. 3 shows a flowchart illustrating an example method 200 of operating a multiplayer online game with viral rewards that have dynamically determined exchange rates.

FIG. 3 depicts an example method 300 for operating a multiplayer online game with dynamic viral rewards according to various embodiments of the present disclosure. In step 310, a game engine can evaluate the number of in-game assets currently granted or in circulation within the game. For example, the game engine can determine that $1 million of virtual currency is currently in circulation amongst its 10,000 players and determined that on average each one of those players has approximately $100 of virtual currency. The game engine can reference various parameters, input these into an algorithm, and dynamically calculate an asset requirement for in-game rewards that is out of reach of some, most, or all of the players in step 320. In terms of this example, the game engine can set the asset requirement of a reward at $1000 of virtual currency. Setting the exchange rate just out of reach of some portion of the players gives those players an incentive to continue playing the game. In other embodiments, the game engine can use more sophisticated analysis to determine the asset requirement for acquiring a certain reward.

Similarly, the game engine can evaluate the evolution of the social graphs of some or all of the game players to determine the number of successful invitations required for the players to receive a reward. As with the asset requirement, the game engine can set the social requirement (e.g., the number of successful invitations required) just out of reach of some or all of the game players. In this way, players are further incentivized to continue inviting and/or encouraging members of their social graph to join the game.

When a player character satisfied all of the acquisitions requirements (e.g., accumulate enough in-game assets, tallies enough successful invitation, plays for a certain time), the game engine can offer to provide a reward to the player character in step 330. In some embodiments, this may deplete some of the player character's assets, reset his social link tally, or reset relevant game states with respect to the player character. In some embodiments, player characters must actively seek out the opportunity to acquire rewards. In other embodiments, the game engine can remind or actively offer players the opportunity to acquire rewards.

Once some number of rewards is distributed, the game engine can reset the acquisition requirements for the reward in step 340. As in step 310, this can be done by referencing a variety of factors. In games with multiple degrees of rewards, the acquisition requirements for all degrees of rewards may similarly be reset, such that higher-degree rewards are out of reach of a portion of player characters. By continually adjusting or resetting the social requirement for higher-degree rewards to be equal to that of lower-degree rewards plus a number of additional successful invitations, the game engine can continually incentivize existing users to increase the number of interactions with other users from their social network.

Figure 4:
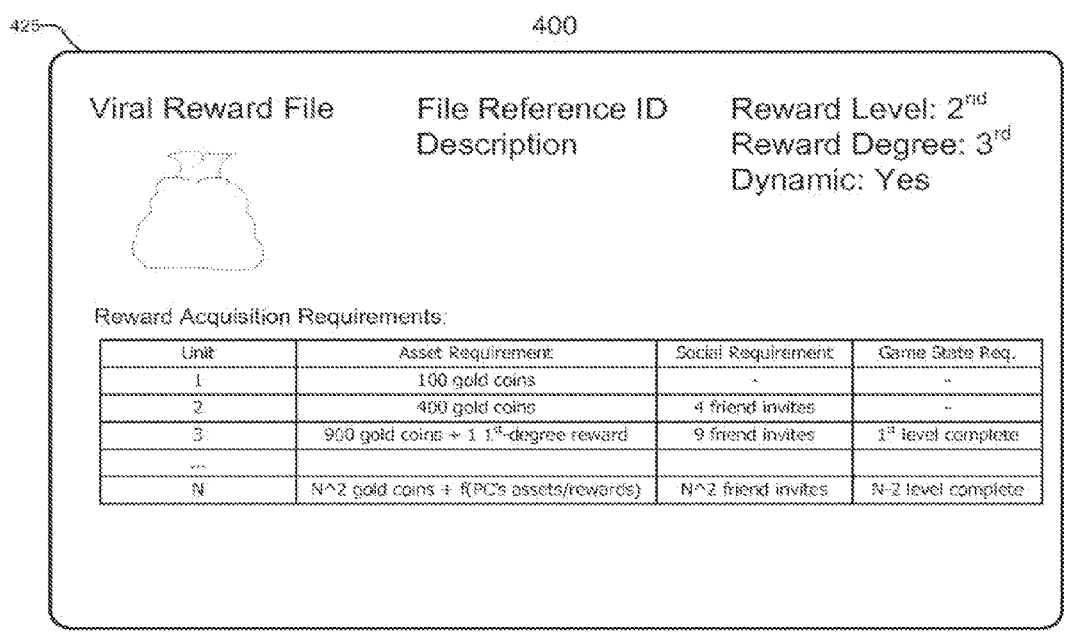
FIG. 4 shows a viral reward file.

FIG. 4 depicts a viral rewards file 400 according to various embodiments of the present invention. As shown, with viral rewards file 400 can include various types of information that the game engine can use to determine the acquisition requirements of the particular viral rewards identified by the file reference ID and the description. For instance, the acquisition requirements for the particular viral reward included in the viral rewards file 400 can include formalistic requirements for acquiring more of the particular viral reward. In some embodiments, each additional units of the viral reward can require an incremental increase in the number of the assets and successful invitations required for the acquisition of the next unit of the viral reward. In other embodiments, the acquisition requirements for the viral reward can be dynamic and algorithmically determined by the game engine based on the amount of the particular in-game assets in circulation or previously granted in the game or the amounts of the assets and rewards granted or currently in circulation in the game.

Additionally, the game engine can also consider the evolution of the social network of some or all of the players in the game. Examination of the evolution of the social network of the players in the game can include the speed and depth with which players make connections within a particular social network.

In various embodiments, the more friends a player successfully invites from his social graph to join the game can entitle that player to more valuable or higher-degree rewards. Additionally, the more successful invitations the player is attributed with can lower the acquisition requirements of lower-degree rewards, which the player may be able to trade in (i.e., trade up) for higher-degree rewards. The game engine can choose to reward the player who has invited more players than an average player by making higher-degree rewards less expensive in terms of the lower-degree rewards.

Within the hierarchy of rewards, various assets and rewards can be of a limited-edition nature whereby only a set number of a particular reward will ever be released into circulation or granted within the game. For example, a game may only have one Axe of Ancient Dwarvish Lords, which can only be acquired the player character who is the first to acquire a virtual castle and get 1,000 friends to join his in-game clan; other player characters who subsequently satisfy these requirements will not receive the reward. In other embodiments of the present invention, in-game assets and rewards can be fungible within the game and outside of the game for real world currency. In other embodiments, in-game assets and rewards can be non-fungible. In other embodiments, certain rewards can only be acquired in exchange for some mix of one or more types of in-game assets and some mix of one or more successful invitations of friends of various degrees to join the game.

Systems and Methods:

In the various embodiments, the computer-implemented game may be a text-based or turn-based game implemented as a series of web pages that are returned after a user selects one or more actions to perform. In other implementations, the computer-implemented game may be an animated or rendered game executable as a stand-alone application or within the context of a web page or other structured document. In one implementation, the computer-implemented game can be implemented using FLASH(r)-based technologies. For example, the game can be fully or partially implemented as a SWF object that is embedded in a web page and executable by a FLASH(r) media player plug-in. In various example embodiments, one or more described webpages may be associated with a networking system or networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 5:
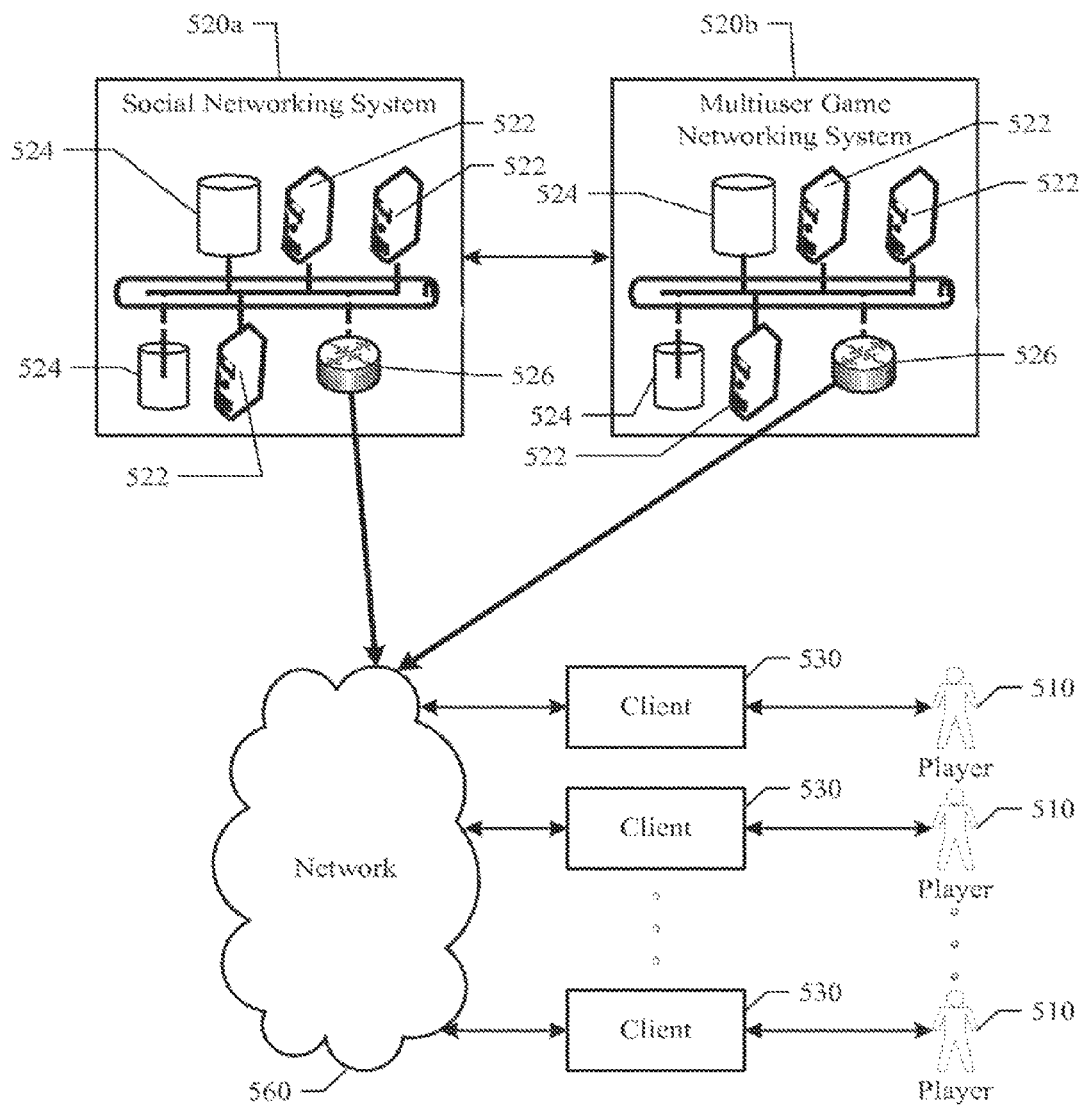
FIG. 5 illustrates an example network environment.

Particular embodiments may operate in a wide area network environment, such as the Internet, including multiple network addressable systems. FIG. 5 illustrates an example network environment, in which various example embodiments may operate. Network cloud 560 generally represents one or more interconnected networks, over which the systems and hosts described herein can communicate. Network cloud 560 may include packet-based wide area networks (such as the Internet), private networks, wireless networks, satellite networks, cellular networks, paging networks, and the like. As FIG. 5 illustrates, particular embodiments may operate in a network environment comprising social networking system 520a, multiuser game networking system 520b, and one or more client devices 30. However, a social networking system separate from the multiuser game networking system is not necessary. It is possible for the systems to be combined, such that the social networking system and the multiuser game networking system are part of the same system. Consequently, hereinafter, social networking systems 520a and multiuser game networking system 520b may be referred to simply as networking system 520. Client devices 30 are operably connected to the network environment via a network service provider, a wireless carrier, or any other suitable means.

In one example embodiment, networking system 520 comprises computing systems that allow users to communicate or otherwise interact with each other and access content, such as a multiuser online game, game player profiles, social network profiles, and other content as described herein. Networking system 520 is a network addressable system that, in various example embodiments, comprises one or more physical servers 522 and data stores 524. The one or more physical servers 522 are operably connected to computer network 560 via, by way of example, a set of routers and/or networking switches 526. In an example embodiment, the functionality hosted by the one or more physical servers 522 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Flash, ActionScript, Asynchronous JavaScript and XML (AJAX), and the like.

Physical servers 522 may host functionality directed to the operations of networking system 520. By way of example, networking system 20 may host a website that allows one or more users, at one or more client devices 30, to access a multiuser online game, access an online social network, as well as communicate and interact with one another via the website. Hereinafter servers 522 may be referred to as server 522, although server 522 may include numerous servers hosting, for example, networking system 520, as well as other content distribution servers, data stores, and databases. Data store 524 may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 524 corresponds to one or more of a variety of separate and integrated databases, such as relational databases and object-oriented databases, that maintain information as an integrated collection of logically related records or files stored on one or more physical systems. Structurally, data store 524 may generally include one or more of a large class of data storage and management systems. In particular embodiments, data store 524 may be implemented by any suitable physical system(s) including components, such as one or more database servers, mass storage media, media library systems, storage area networks, data storage clouds, and the like. In one example embodiment, data store 524 includes one or more servers, databases (e.g., MySQL), and/or data warehouses.

Data store 524 may include data associated with different networking system 520 users and/or client devices 530. In particular embodiments, the networking system 520 maintains a user profile for each user of the system 520. User profiles include data that describe the users of a network, which may include, for example, proper names (first, middle and last of a person, a trade name and/or company name of a business entity, etc.), biographic, demographic, and other types of descriptive information, such as work experience, educational history, hobbies or preferences, geographic location, and additional descriptive data. By way of example, user profiles may include a user's birthday, relationship status, city of residence, and the like. The system 520 may further store data describing one or more relationships between different users. The relationship information may indicate users who have similar or common work experience, group memberships, hobbies, or educational history. A user profile may also include privacy settings governing access to the user's information is to other users.

Client device 530 is generally a computer or computing device including functionality for communicating (e.g., remotely) over a computer network. Client device 530 may be a desktop computer, laptop computer, personal digital assistant (PDA), in- or out-of-car navigation system, smart phone or other cellular or mobile phone, or mobile gaming device, among other suitable computing devices. Client device 530 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 530 to enter addresses of specific network resources to be retrieved, such as resources hosted by networking system 520. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

Networking system 520 may include a multitude of features with which users at remote clients 530 may interact during user sessions. In particular embodiments, these features may be implemented as web applications and may utilize JavaScript and CSS resources requested from servers 522 as well as other external servers or data stores. The web applications or resources may be embedded in various underlying or base web pages served to remote clients, such as in frames or iFrames, sections or "dies" and the like. By way of example, a computer-implemented game may be implemented as a FLASH object that is embedded into an HTML document and executable within the context of a client application, such as a browser. In one such implementation, a game hosted by game networking system 520b may be embedded into web pages served by social networking system 520a. In other implementations, game networking system 520b may serve web pages, including the embedded game application, directly to users.

In particular embodiments, the networking system 520 maintains in data store 524 a number of objects for the different kinds of items with which a user may interact while accessing networking system 520. In one example embodiment, these objects include game network user profiles, social network user profiles, application objects, and message objects (such as for wall posts, emails and other messages). In one embodiment, an object is stored by the system 520 for each instance of its associated item. These objects and the actions discussed herein are provided for illustration purposes only, and it can be appreciated that an unlimited number of variations and features can be provided on a networking system 520.

When a user at a client device (e.g., client device 530) desires to view a particular web page (hereinafter also referred to as target structured document) hosted by networking system 520, the user's web browser, or other document rendering engine or suitable client application, formulates and transmits a request to networking system 520. The request generally includes a URL or other document identifier as well as metadata or other information. By way of example, the request may include information identifying the user, such as a user ID, as well as information identifying or characterizing the web browser or operating system running on the user's client computing device 530. The request may also include location information identifying a geographic location of the user's client device or a logical network location of the user's client device. The request may also include a timestamp identifying when the request was transmitted.

Figure 6:
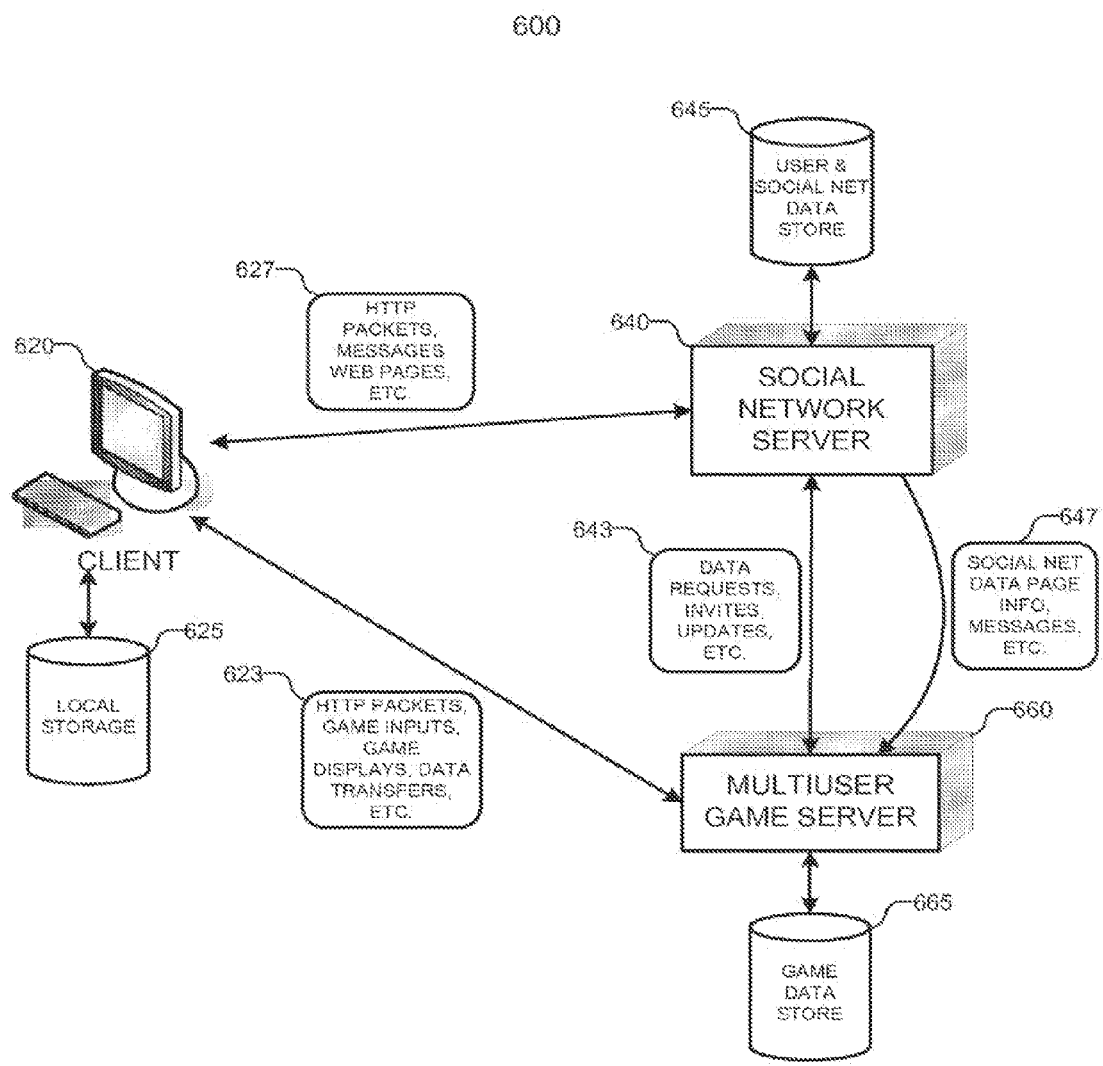
FIG. 6 depicts a schematic of a system and data flow for operating an online multiplayer game.

FIG. 6 depicts a schematic of system 600 and data flow between the components of system 600 for operating an online multiuser game. System 600 can include a client system 620, a social network server 640 and multiuser game server 660. Client system 620, social network server 640 and multiuser game server 660 can each have a corresponding data store such as local storage medium 625, user and social network storage medium 645 and game data storage medium 665, respectively. Client system 620 can communicate with social network server 640 to receive web pages, messages, etc. Additionally, client system 620 can transmit data to and receive data from 623 (including game inputs, team displays, data transfers, etc.) multiuser game server 660. In a similar fashion, multiuser game server 660 and social network server 640 can communicate HTTP packets 643 including data requests, invites, updates, etc. with social network server 640. At some other time, or at the same time, social network server 640 can communicate social network data, page info, messages, etc. data 647 with multiuser game server 660. As mentioned above, communication between client system 620, social network server 640 and multiuser game server 660 can occur over any appropriate electronic communication medium.

Figure 7:
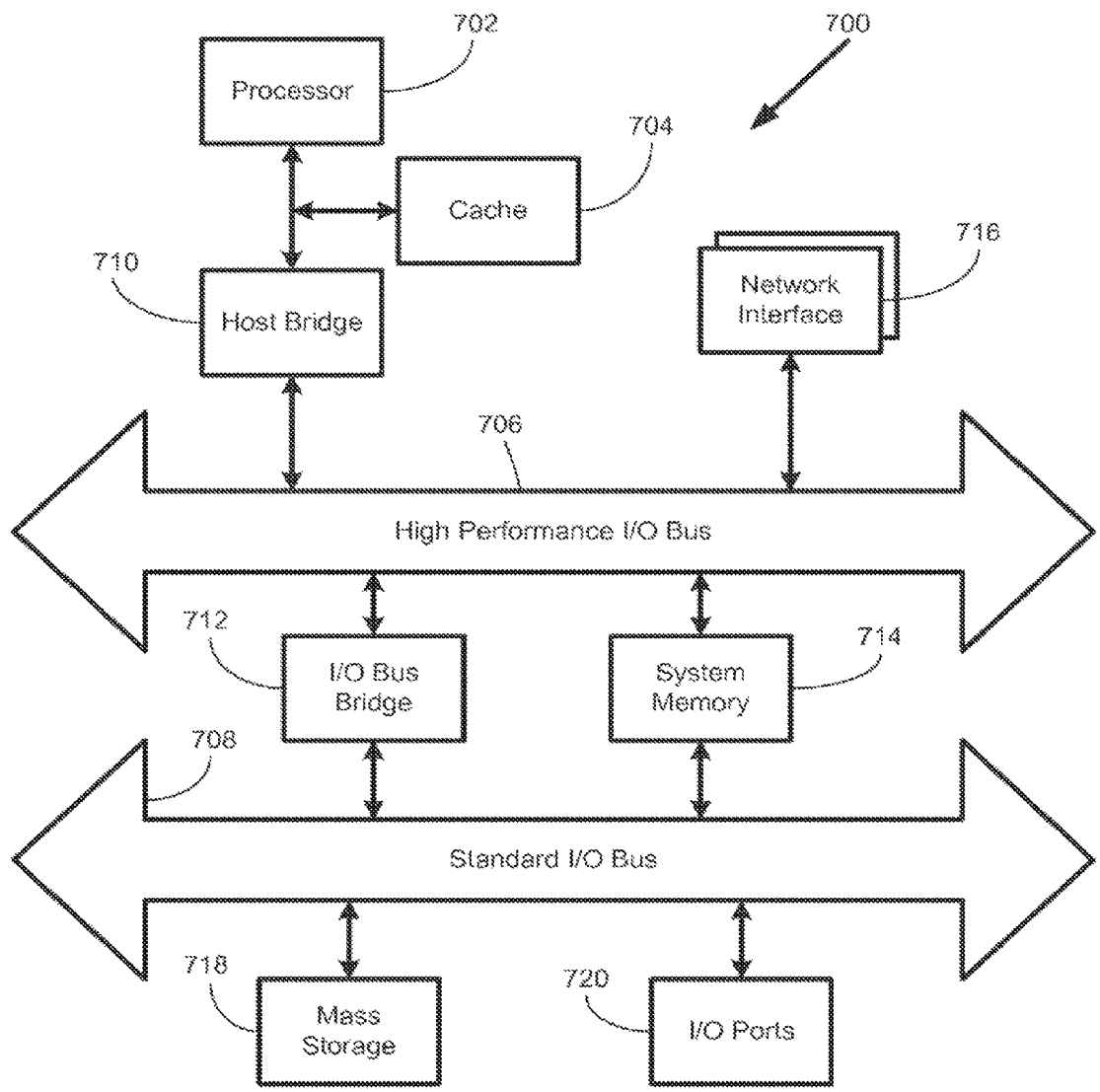
FIG. 7 illustrates an example computer system architecture.

FIG. 7 illustrates an example computing system architecture, which may be used to implement a server 522 or a client device 530 (or each node of a distributed computing system). In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 718, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in the servers 522, whereas system memory 714 (e.g., DRAM) provides temporary storage for the data and programming instructions when executed by processor 802. I/O ports 720 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present invention may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the invention.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistant, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method comprising:
hosting an online game for a plurality of players; and
providing, using at least one processor, to a player of the online game, a first asset based on satisfaction of a first acquisition requirement for the first asset, the first acquisition requirement comprising a first social requirement that is satisfied by a new association of a first predetermined number of people and a second predetermined number of people with the online game, the first predetermined number of people being a first predetermined number of first-degree friends of the player selected from a social network of the player, and the second predetermined number of people being a second predetermined number of second-degree friends of the player selected from the social network of the player.

2. The method of claim 1, the first asset comprising an in-game asset to be used in the online game.

3. The method of claim 1, the first predetermined number of people and the second predetermined number of people comprising non-players of the online game, the new association of the first predetermined number of people and the second predetermined number of people with the online game comprising the first predetermined number of people and the second predetermined number of people joining the online game as new players.

4. The method of claim 3, further comprising facilitating a transfer of in-game assets from the player to at least one of the new players in response to the new players joining the online game.

5. The method of claim 3 further comprising facilitating the new players joining an in-game team comprising the player.

6. The method of claim 3, the new association of the first predetermined number of people and the second predetermined number of people with the online game comprising the new players joining a player group including the player.

7. The method of claim 3, the new association of the first predetermined number of people and the second predetermined number of people with the online game comprising the new players and the player pursuing a same goal in the online game.

8. The method of claim 1, the first predetermined number of people and the second predetermined number of people comprising players of the online game, the new association of the first predetermined number of people and the second predetermined number of people with the online game comprising an in-game social connection of each of the first predetermined number of people and the second predetermined number of people with at least one other of the plurality of players.

9. The method of claim 1, the first predetermined number of people and the second predetermined number of people comprising players of the online game, the new association of the first predetermined number of people and the second predetermined number of people with the online game comprising an in-game contact relationship of each of the first predetermined number of people and the second predetermined number of people with at least one other of the plurality of players.

10. The method of claim 1 further comprising dynamically varying the social requirement based on changes in the social network of the player.

11. The method of claim 10, the changes in the social network comprising at least one of a speed with which the player makes connections with other individuals, and a depth with which the player makes connections with other individuals.

12. The method of claim 1, the first acquisition requirement further comprising at least one of an in-game asset requirement and a game state requirement.

13. A non-transitory computer-readable storage medium comprising instructions that, when executed by at least one processor of a machine, cause the machine to perform operations comprising:
 hosting an online game for a plurality of players; and
 providing to a player of the online game a first asset based on satisfaction of a first acquisition requirement for the first asset, the first acquisition requirement comprising a first social requirement that is satisfied by a new association of a first predetermined number of people and a second predetermined number of people with the online game, the first predetermined number of people being a first predetermined number of first-degree friends of the player selected from a social network of the player, and the second predetermined number of people being a second predetermined number of second-degree friends of the player selected from the social network of the player.

14. An online game system configured to:
 host an online game for a plurality of players; and
 provide to a player of the online game a first asset based on satisfaction of a first acquisition requirement to acquire the first asset, the first acquisition requirement comprising a first social requirement that is satisfied by a new association of a first predetermined number of people and a second predetermined number of people with the online game, the first predetermined number of people being a first predetermined number of first-degree friends of the player selected from a social network of the player, and the second predetermined number of people being a second predetermined number of second-degree friends of the player selected from the social network of the player.

15. The online game system of claim 14 configured to retrieve information describing the social network from a social network system, the social network system being managed by a first entity that is different than a second entity managing the online game network system.

16. The online game system of claim 15 configured to generate and store information describing a second social network for the player, the second social network being different from the first social network corresponding to the social network system.

17. The online game system of claim 16, the information describing the second social network indicating whether a member of the second social network is an in-game friend of the player, a social network friend of the player, or both.

* * * * *

UNITED STATES PATENT AND TRADEMARK OFFICE
CERTIFICATE OF CORRECTION

PATENT NO. : 8,690,684 B2
APPLICATION NO. : 13/244755
DATED : April 8, 2014
INVENTOR(S) : Vanbragt et al.

It is certified that error appears in the above-identified patent and that said Letters Patent is hereby corrected as shown below:

In the Drawings:

On Sheet 1 of 7, Fig. 1, insert --100--, therefor

On Sheet 2 of 7, Fig. 2, insert --200--, therefor

On Sheet 3 of 7, Fig. 3, insert --300--, therefor

In the Specification:

In column 2, line 59, before "edges", insert --N--, therefor

In column 4, line 60, delete "steel." and insert --steel,--, therefor

In column 5, line 8, delete "sec" and insert --see--, therefor

In column 5, line 20, delete "example;" and insert --example,--, therefor

In column 6, line 7, delete "130." and insert --250.--, therefor

In column 9, line 16, delete "30." and insert --530.--, therefor

In column 9, line 21, delete "systems" and insert --system--, therefor

In column 9, line 23, delete "30" and insert --530--, therefor

In column 9, line 48, delete "20" and insert --520--, therefor

In column 9, line 49, delete "30," and insert --530,--, therefor

Signed and Sealed this
Twenty-eighth Day of October, 2014

Michelle K. Lee
*Deputy Director of the United States Patent and Trademark Office*

CERTIFICATE OF CORRECTION (continued)
U.S. Pat. No. 8,690,684 B2

In column 11, line 18, delete ""dies"" and insert --"divs"--, therefor

In column 12, line 49, delete "802." and insert --702.--, therefor